(12) United States Patent
Yuki et al.

(10) Patent No.: US 7,691,784 B2
(45) Date of Patent: Apr. 6, 2010

(54) RECEPTOR LAYER FORMING RESIN FOR THERMAL TRANSFER IMAGE RECEPTOR SHEET AND THERMAL TRANSFER IMAGE RECEPTOR SHEET USING THE SAME

(75) Inventors: Masahiro Yuki, Tokyo-to (JP); Kazuya Yoshida, Tokyo-to (JP); Kuniyuki Doi, Otsu (JP); Hirotoshi Kizumoto, Otsu (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 637 days.

(21) Appl. No.: 11/393,112

(22) Filed: Mar. 30, 2006

(65) Prior Publication Data
US 2006/0229202 A1 Oct. 12, 2006

(30) Foreign Application Priority Data
Mar. 30, 2005 (JP) .............................. 2005-100191

(51) Int. Cl.
*B41M 5/035* (2006.01)
*B41M 5/50* (2006.01)

(52) U.S. Cl. .................................. 503/227; 428/32.39
(58) Field of Classification Search ........................ None
See application file for complete search history.

(56) References Cited

U.S. PATENT DOCUMENTS
5,695,884 A 12/1997 Ishimaru et al.

FOREIGN PATENT DOCUMENTS
| EP | 0 133 011 | 2/1985 |
|---|---|---|
| EP | 0 464 750 | 1/1992 |
| JP | 6-79974 | 3/1994 |

*Primary Examiner*—Bruce H Hess
(74) *Attorney, Agent, or Firm*—Ladas & Parry LLP

(57) ABSTRACT

A main object of the present invention is to provide a receptor layer forming resin which makes it possible to obtain a receptor layer for a thermal transfer image receptor sheet having excellent dyeing property. The present invention achieves the above object by providing a receptor layer forming polyurethane resin for a thermal transfer image receptor sheet obtained by copolymerizing: a high molecular weight polyol having a number average molecular weight of 1000 or higher (A); an organic isocyanate (B); and according to need, a polyol compound having a number average molecular weight of 500 or lower (C), wherein the receptor layer forming polyurethane resin for a thermal transfer image receptor sheet meets the following requirements (1) to (4):
(1) the resin has at least two glass transition temperatures;
(2) at least one of the glass transition temperatures is between −200 to 0° C., and at least one is between 20 to 100° C.;
(3) the high molecular weight polyol (A) is a mixture comprising; an aromatic polyester polyol containing metallic base sulfonate (A-1); and a polyol other than said (A-1) (A-2); and
(4) the ratio of (A-2) in the high molecular weight polyol (A) is 20 mass percent or higher.

3 Claims, No Drawings

RECEPTOR LAYER FORMING RESIN FOR THERMAL TRANSFER IMAGE RECEPTOR SHEET AND THERMAL TRANSFER IMAGE RECEPTOR SHEET USING THE SAME

BACKGROUND OF THE INVENTION

1. Field of the Invention

The present invention relates to a receptor layer forming resin for a thermal transfer image receptor sheet having excellent dyeing property, light resistance, mold-releasing property, etc. and to a thermal transfer image receptor sheet using the same.

2. Description of the Related Art

As a method for forming an image by utilizing thermal transfer, a method (sublimation type thermal transfer system) is known, in which a full color image is formed by laminating: a thermal transfer sheet obtained by supporting a substrate sheet, such as paper or plastic film, with a sublimation dye as a recording material; and a thermal transfer image receptor sheet obtained by providing a receptor layer for the dye on paper or a plastic film. Because this method uses a sublimation dye as a coloring material, density and gradation can be freely controlled by unit of a dot, so that a full color image exactly according to a manuscript can be expressed on the image receptor sheet. Therefore, it is applied to the formation of a color image in digital cameras, videos, computers and the like. The image has high quality which stands comparison with that of a silver salt photograph.

In order to obtain a high quality image and the like on a thermal transfer image receptor sheet, the receptor layer must have excellent dyeing property, light resistance, mold-releasing property and the like. With regard to the dyeing property, it is usually possible to obtain a receptor layer having excellent dyeing property by using a resin having a relatively low glass transition temperature. However, the resin having a low glass transition temperature has a problem that it is easily melted by a heat in a transfer operation and fused to other members.

On the other hand, by using a resin having a relatively high transition temperature, a receptor layer having excellent mold-releasing property, light resistance, and the like can be obtained. Though such a receptor layer does not give rise to the problems described above such as the fusion, a resin having a high glass transition temperature has a problem that it is difficult to be softened during a thermal transfer operation so that it is not very much dyed with a dye, which makes it difficult to obtain a high quality image and the like.

To deal with such problems, using of a mixture, of the above-described resins having a low glass transition temperature and the resin having a high glass transition temperature, is proposed. For example, Japanese Patent Application Laid-Open (JP-A) No. 6-79974 discloses a receptor layer using a resin having a glass transition temperature of −100 to 20° C. and a resin having a glass transition temperature of 40° C. or higher. In a method disclosed in JP-A No. 6-79974, the above two types of resins are mixed to form a receptor layer. In this case, however, there is a problem that the glass transition temperature of the resulting receptor layer will be an average of the two. Therefore, the effect of the resin having low grass transition temperature, that excellent dyeing property can be imparted, and the effect of the resin having high glass transition temperature, that excellent mold-releasing property and light resistance can be imparted, are offset.

SUMMARY OF THE INVENTION

The present invention has been accomplished in view of the above mentioned problems, and a main object of the present invention is to provide a receptor layer forming resin which makes it possible to obtain a receptor layer for a thermal transfer image receptor sheet having excellent dyeing property.

The present invention provides a receptor layer forming polyurethane resin for a thermal transfer image receptor sheet obtained by copolymerizing: a high molecular weight polyol having a number average molecular weight of 1000 or higher (A); an organic isocyanate (B); and according to need, a polyol compound having a number average molecular weight of 500 or lower (C), characterized in that the receptor layer forming polyurethane resin for a thermal transfer image receptor sheet meets the following requirements (1) to (4):

(1) the resin has at least two glass transition temperatures;

(2) at least one of the glass transition temperatures is between −200 to 0° C., and at least one is between 20 to 100° C.;

(3) the high molecular weight polyol (A) is a mixture comprising; an aromatic polyester polyol containing metallic base sulfonate (A-1); and a polyol other than said (A-1) (A-2); and (4) the ratio of (A-2) in the high molecular weight polyol (A) is 20 mass percent or higher.

In the present invention, since the receptor layer forming polyurethane resin for a thermal transfer image receptor sheet is obtained by copolymerizing: a high molecular weight polyol having a number average molecular weight of 1000 or higher (A); an organic isocyanate (B); and according to need, a polyol compound having a number average molecular weight of 500 or lower (C) and meets the requirements (1) to (4), the dyeing property, light resistance and mold-releasing property of the receptor layer for a thermal transfer image receptor sheet can be improved.

Moreover in the above-mentioned invention, it is preferable that the polyol (A-2) is a polypropylene glycol. This is because a receptor layer for a thermal transfer image receptor sheet having excellent dyeing property can be obtained.

Moreover in the above-mentioned invention, it is preferable that the organic isocyanate (B) is an alicyclic or aliphatic diisocyanate. This is because the light resistance of the polyurethane resin can be more improved.

Moreover in the above-mentioned invention, it is preferable that the resin has a number average molecular weight of 8,000 or higher and 100,000 or lower. This is because a receptor layer for a thermal transfer image receptor sheet having excellent dyeing property and the like can be obtained.

Also, the present invention provides a receptor layer for a thermal transfer image receptor sheet, characterized in that the above-described receptor layer forming polyurethane resin is used.

In the present invention, by using the receptor layer forming polyurethane resin, the receptor layer for a thermal transfer image receptor sheet having excellent dyeing property and the like can be obtained.

Also, the present invention provides a thermal transfer image receptor sheet comprising: a substrate sheet; and the above-described receptor layer for a thermal transfer image receptor sheet on at least one surface of the substrate sheet.

In the present invention, by using the receptor layer for a thermal transfer image receptor sheet, the thermal transfer image receptor sheet having excellent dyeing property and the like can be obtained.

The present invention have effects that a receptor layer for a thermal transfer image receptor sheet having excellent dyeing property, light resistance, mold-releasing property, etc. can be obtained.

DESCRIPTION OF THE PREFERRED EMBODIMENTS

Hereinafter, the receptor layer forming polyurethane resin (in this specification, it may be referred to as "polyurethane resin"), the receptor layer for a thermal transfer image receptor sheet and the thermal transfer image receptor sheet of the present invention will be explained.

A. Receptor Layer Forming Polyurethane Resin

The receptor layer forming polyurethane resin of the present invention is obtained by copolymerizing: a high molecular weight polyol having a number average molecular weight of 1000 or higher (A); an organic isocyanate (B); and according to need, a polyol compound having a number average molecular weight of 500 or lower (C), characterized in that the receptor layer forming polyurethane resin for a thermal transfer image receptor sheet meets the following requirements (1) to (4):

(1) the receptor layer forming polyurethane resin for a thermal transfer image receptor sheet has at least two glass transition temperatures;

(2) at least one of the glass transition temperatures is between −200 to 0° C., and at least one is between 20 to 100° C.;

(3) the high molecular weight polyol (A) is a mixture comprising; an aromatic polyester polyol containing metallic base sulfonate (A-1); and a polyol other than said (A-1) (A-2); and (4) the ratio of (A-2) in the high molecular weight polyol (A) is 20 mass percent or higher.

In the present invention, the polyurethane resin comprises: a high molecular weight polyol (A) which is a mixture containing a specific aromatic polyester polyol (A-1) and a polyol (A-2) other than the polyol (A-1); an organic isocyanate (B); and according to the need, a low molecular weight polyol compound (C), and also, the polyurethane resin contains the polyol (A-2) at a specific ratio in the high molecular weight polyol (A). By using such polyurethane resin as the receptor layer for a thermal transfer image receptor sheet, dyeing property and mold-releasing property can be improved. Further, by using a specific organic isocyanate (B), the light resistance and the like of the receptor layer for a thermal transfer image receptor sheet can be improved.

In the prior art, the dyeing property, light resistance, etc. of the resulting receptor layer for a thermal transfer image receptor sheet is intended to be improved by mixing two or more types of resin. However, there is a case that sufficient dyeing property and light resistance is not obtained. The polyurethane resin of the present invention contains two or more types of polyol components in one molecule. By using the above-mentioned polyurethane resin for the receptor layer for a thermal transfer image receptor sheet, the characteristics of each polyol are not offset so that the receptor layer for a thermal transfer image receptor sheet having excellent dyeing property, light resistance, mold-releasing property and the like can be obtained. Although the reason for this is not clear, it is assumed that, when the polyurethane resin forms a phase separated structure or the like, a spatial restriction is probably made by a molecular chain so that the polyurethane resin can be in its optimum structure.

Hereinafter, each structure of the polyurethane resin of the present invention will be explained.

1. High Molecular Weight Polyol (A)

The high molecular weight polyol (A) used in the present invention reacts with the below-mentioned organic isocyanate (B) to give a polyurethane resin. The high molecular weight polyol (A) used in the present invention is a mixture containing at least an aromatic polyester polyol containing a metallic base sulfonate (A-1) and a polyol other than the polyol (A-1) (A-2). The high molecular weight polyol (A) used in the present invention may contain other polyol having a number average molecular weight of 1000 or higher, besides the aromatic polyester polyol (A-1) and the polyol (A-2).

It is known that commonly used polyurethane resin has a hard/soft segment structure and that the isocyanate part functions as a hard segment and the polyol part functions as a soft segment. However, the polyurethane resin of the present invention contains at least two or more types of polyols in one molecule, namely: a polyol component (in the present invention, it may be referred to as a hard segment, like the isocyanate part) imparting rigidity to the receptor layer for a thermal transfer image receptor sheet; and a polyol component (in the present invention, it may be referred to as a soft segment) imparting softness to the receptor layer for a thermal transfer image receptor sheet. In the present invention, the polyol imparting the hard segment usually corresponds to the aromatic polyester polyol (A-1), and the polyol imparting the soft segment corresponds to the polyol (A-2). Generally, the polyol imparting the hard segment is less compatible with the polyol imparting the soft segment. Also, in the present invention, the hard segment has the ability to improve the light resistance, mold-releasing property, etc. of the receptor layer for a thermal transfer image receptor sheet, and the soft segment has the ability to improve the dyeing property of the receptor layer for a thermal transfer image receptor sheet.

(1) Aromatic Polyester Polyol (A-1)

The aromatic polyester polyol (A-1) used in the present invention contains an aromatic segment and a metallic base sulfonate in a molecule. The aromatic polyester polyol (A-1) is usually a polyol which imparts a hard segment, imparts the rigidity to the receptor layer for a thermal transfer image receptor sheet, and has the ability of improving the light resistance, mold-releasing property, etc. of the receptor layer for a thermal transfer image receptor sheet. Also, by reacting with the below-mentioned polyol (A-2), which is a polyol imparting the soft segment, and with the organic isocyanate (B), the aromatic polyester polyol (A-1) is made into the polyurethane resin of the present invention.

Although it is not limited thereto, examples of the acid component of the aromatic polyester polyol (A-1) used in the present invention include, for example, terephthalic acid, isophthalic acid, orthophthalic acid, naphthalenedicarboxylic acid, 4,4'-diphenyldicarboxylic acid, 2,2'-diphenyldicarboxylic acid and 4,4'-diphenyl ether dicarboxylic acid. Among these compounds, terephthalic acid, isophthalic acid, orthophthalic acid and naphthalenedicarboxylic acid are preferable.

Also, the aromatic polyester polyol (A-1) used in the present invention contains a metallic base sulfonate. This metallic base sulfonate is effective to obtain excellent dyeing property. In the present invention, the aromatic polyester polyol (A-1) containing the metallic base sulfonate is usually obtained by copolymerizing the compound containing the metallic base sulfonate with the acid component. Examples of the compound containing the metallic base sulfonate may include, though not particularly limited thereto, aromatic dicarboxylic acids containing a metallic base sulfonate such as 5-sodiumsulfoisophthalic acid, 5-potassium sulfoisophthalic acid and sodium sulfoterephthalic acid. The metallic base sulfonate is preferably contained in an amount of 10 to 800 equivalents/$10^6$ g in the aromatic polyester polyol (A-1).

Examples of the glycol component of the aromatic polyester polyol (A-1) used in the present invention may include, though not particularly limited thereto, polyethers such as ethylene glycol, propylene glycol, 1,3-propanediol, 2-methyl-1,3-propanediol, 1,3-butylene glycol, 1,4-butanediol, 1,5-pentanediol, 1,6-hexanediol, 1,9-nonanediol, 1,10-dodecanediol, diethylene glycol, triethylene glycol, dipropylene glycol, neopentyl glycol, 2-butyl-2-ethyl-1,3-propanediol, 2-methyl-1,3-propanediol, 3-methyl-1,5-pentanediol, 2,2,4-trimethyl-1,3-pentanediol, 2-methyloctanediol, neopentylhydroxy pivalate, 1,4-cyclohexanedimethanol, 1,3-cyclohexanedimethanol, 1,2-cyclohexanedimethanol, 3(4), 8(9)-tricyclo[$5.2.1.0^{2,6}$]decanedimethanol, hydrogenated bisphenol A, alkylene oxide adduct of hydrogenated bisphenol A, polytetramethylene glycol, polypropylene glycol and polyethylene glycol. Among these compounds, ethylene glycol, propylene glycol, 2-methyl-1,3-propanediol, neopentyl glycol, 1,4-cyclohexanedimethanol, 3(4), 8(9)-tricyclo[$5.2.1.0^{2,6}$]decanedimethanol and hydrogenated bisphenol A are preferable.

Also, the number average molecular weight of the aromatic polyester polyol (A-1) used in the present invention is generally 1000 or higher, preferably in a range of 1000 to 5000 and more preferably in a range of 1000 to 3000.

(2) Polyol (A-2)

The polyol (A-2) used in the present invention is usually a polyol imparting a soft segment, has the ability to impart softness to the receptor layer for a thermal transfer image receptor sheet and has the ability to improve the dyeing property of the receptor layer for a thermal transfer image receptor sheet. Also, the polyol (A-2) used in the present invention is made into the polyurethane resin of the present invention by reacting with the above-mentioned aromatic polyester polyol (A-1) and with the organic isocyanate (B).

As the polyol (A-2) used in the present invention, specifically, those having an aliphatic segment in their molecules are preferable, though not particular limited thereto. This is because a receptor layer for a thermal transfer image receptor sheet having high dyeing property, etc. can be obtained. Specific examples of the polyol (A-2) such as polyester polyols, polycarbonate diols and polyether glycols can be listed. Among these polyols, polyether glycols such as polyethylene glycols, polypropylene glycols and polytetramethylene glycols are preferable and particularly, polypropylene glycols are preferable.

Also, the number average molecular weight of the polyol (A-2) used in the present invention is generally 1000 or higher, preferably in a range of 1000 to 5000 and more preferably in a range of 1000 to 3000.

The ratio of the polyol (A-2) in the high molecular weight polyol (A) used in the present invention is generally 20 mass percent or higher and preferably in a range of 20 to 50 mass percent.

2. Organic Isocyanate (B)

Next, the organic isocyanate (B) used in the present invention will be explained. The organic isocyanate (B) used in the present invention imparts a polyurethane resin by reacting with such as the high molecular weight polyol (A) described above.

The ratio of the organic isocyanate (B) in the polyurethane resin of the present invention is specifically in a range of 8 to 30 mass percent, though it is not particular limitation thereto.

The organic isocyanate (B) used in the present invention is not particularly limited as long as a desired polyurethane resin can be obtained. Specific examples of the organic isocyanate may include aromatic isocyanates, aliphatic or alicyclic isocyanates, etc. Examples of the aromatic isocyanate may include tolylenediisocyanate, 4,4'-diphenylmethanediisocyanate, triphenylmethanetriisocyanate, adduct bodies of tolylenediisocyanate and trimethylolpropane, tolylenediisocyanate trimers, etc. Examples of the aliphatic or alicyclic isocyanate may include hexamethylenediisocyanate, dicyclohexylmethanediisocyanate, isophoronediisocyanate, trimethylhexamethyleneisocyanate, 1,6,11-undecanetriisocyanate, lysinediisocyanate, lysin ester triisocyanate, 1,8-diisocyanate-4-isocyanate methyloctane, 1,3,6-hexanemethylenetriisocyanate bicycloheptanetriisocyanate, modifications or derivatives of these compounds, etc. Among these compounds, the organic isocyanate (B) is preferably an organic diisocyanate. To further improve the light resistance of the polyurethane resin, the organic isocyanate (B) is more preferably an alicyclic or aliphatic diisocyanate.

3. polyol Compound (C)

The polyurethane resin of the present invention may contain a polyol compound (C) having a number average molecular weight of 500 or less, according to the need. In the present invention, the number average molecular weight of the polyol compound (C) is more preferably in a range of 50 to 500.

The polyol compound (C) used in the present invention is not particularly limited as long as a desired polyurethane resin can be obtained. Examples of the polyol compound (C) include 1,2-propylene glycol, 1,3-propanediol, 1,2-butyleneglycol, 1,3-butyleneglycol, 2,3-butylene glycol, 2,2-dimethyl-1,3-propanediol, 3-methyl-1,5-pentanediol, 2,2,4-trimethyl-1,3-pentanediol, 2-ethyl-1,3-hexanediol, 2,2-dimethyl-3-hyxroxypropyl-2',2'-dimethyl-3-hydroxypropanate, 2-n-butyl-2-ethyl-1,3-propanediol, 3-ethyl-1,5-pentanediol, 3-propyl-1,5-pentanediol, 2,2-diethyl-1,3-propanediol, 3-octyl-1,5-pentanediol, 3-phenyl-1,5-pentanediol, 2,5-dimethyl-3-sodiumsulfo-2,5-hexanediol, other oligomers, etc. The introduction of these leads to an increase in the density of urethane bonding groups and therefore, the toughness of the polyurethane resin can be more improved.

Also, when the polyol compound (C) is used in the present invention, though not particularly limited thereto, the ratio of the polyol compound (C) in the polyurethane resin of the present invention is specifically in a range of 0 to 50 mass percent and preferably in a range of 0.5 to 30 mass percent.

4. Polyurethane Resin

The polyurethane resin of the present invention is obtained by reacting the high molecular weight polyol (A), the organic isocyanate (B) and according to the need, the polyol compound (C).

The number average molecular weight of the polyurethane resin of the present invention is not particularly limited as long as a desired receptor layer for a thermal transfer image receptor sheet can be obtained. Specifically, it is in a range of 8,000 or higher and 100,000 or lower, preferably in a range of 10,000 or higher and 30,000 or lower.

Also, the polyurethane resin of the present invention has at least two glass transition temperatures, wherein at least one glass transition temperature is in a range of −200 to 0° C. and at least one is in a range of 20 to 100° C. In the present invention, among the above-mentioned range of −200 to 0° C., a temperature range of −100 to 0° C. is preferable. Also, among the above-mentioned range of 20 to 100° C., a temperature range of 40 to 100° C. is preferable. This is because when all glass transition temperatures are over 0° C., satisfying dyeing property may not be obtained. And when all glass transition temperatures are below 20° C., the polyurethane resin may be fused to other members. The term "glass transition temperature" so-called in the present invention means the temperature at which the loss elastic modulus (E") shows it peak when dynamic viscoelasticity is measured by: producing a polyurethane resin film 30 μm in thickness; cutting the obtained resin film into a size of 4 mm×15 mm; and measuring the dynamic viscoelasticity of the resin film by using a viscoelasticity measuring device (trade name: DVA-220, manufactured by IT Keisoku Seigyo Co., Ltd.) under condition of frequency of 10 Hz, measuring temperature range of −250 to 200° C., temperature rising rate of 4° C./min. Moreover, by using the high molecular weight polyol (A) the organic isocyanate (B) and, according to the need, the polyol compound (C), the polyurethane resin of the present invention can be obtained by a common method.

B. Receptor Layer for a Thermal Transfer Image Receptor Sheet

Next, the receptor layer for a thermal transfer image receptor sheet of the present invention will be explained. The receptor layer for a thermal transfer image receptor sheet comprises the receptor layer forming polyurethane resin.

In the present invention, by using the above-mentioned receptor layer forming polyurethane resin, a receptor layer for a thermal transfer image receptor sheet having excellent dyeing property and the like can be obtained.

Also, the receptor layer for a thermal transfer image receptor sheet of the present invention contains at least the receptor layer forming polyurethane resin. It is preferable that the receptor layer for a thermal transfer image receptor sheet of the present invention further contains a mold releasing agent to improve its mold-releasing property. Such mold releasing agent is not particularly limited. Specifically, a polysiloxane, silicone oil, phosphate type surfactant, fluorine type surfactant and other mold releasing agents known in the technical field may be used. Silicone oil is preferably used.

Moreover, specific examples of the silicone oil include: modified silicone oils such as epoxy modified silicone oil, alkyl modified silicone oil, amino modified silicone oil, carboxyl modified silicone oil, alcohol modified silicone oil, fluorine modified silicone oil, alkylaralkyl polyether modified silicone oil, epoxy/polyether modified silicone oil and polyether modified silicone oil; vinyl modified silicone oil; OH modified silicone having an active hydrogen; etc. The above mold releasing agents are used either singly or in combinations of two or more. The adding amount of the mold releasing agent is preferably 0.5 to 30 parts by weight based on 100 parts by weight of the polyurethane.

Moreover, the receptor layer for a thermal transfer image receptor sheet of the present invention may contain a lubricant, an ultraviolet absorber, a light stabilizer, an antioxidant, etc. according to the need. The lubricant used in the present invention is used to maintain a good travelling performance of a thermal transfer ribbon and the like during a thermal transfer operation. The lubricant is not particularly limited as long as it does not hinder the colorant receiving property of the receptor layer for a thermal transfer image receptor sheet and it can maintain a good travelling performance of a thermal transfer ribbon and the like. However, specific examples of the lubricant include: inorganic type lubricants such as calcium carbonate, silica and barium sulfate; and organic type lubricants such as polytetrafluoroethylene, polyethylene, waxes (for example, fatty acid, aliphatic alcohol and aliphatic amide) and metal salts of higher fatty acids (zinc stearate). Among these compounds, it is preferable to use silica or fatty acid amide.

Moreover, the content of the lubricant is 3 to 20 mass percent and preferably 7 to 15 mass percent to the polyurethane resin. This is because when the content of the lubricant is in the above-mentioned range, the good travelling performance of the thermal transfer ribbon and the like can be maintained. Also, in the present invention, these lubricants may be used either singly or in combinations of two or more. It is preferable to use the organic type lubricant together with the inorganic type lubricant from the viewpoint of travelling performance.

The film thickness of the receptor layer for a thermal transfer image receptor sheet of the present invention is not particularly limited. Specifically, it is in a range of 0.1 to 20 μm, preferably in a range of 0.5 to 10 μm.

Next, a method for manufacturing a receptor layer for a thermal transfer image receptor sheet in the present invention will be explained. The method for manufacturing a receptor layer for a thermal transfer image receptor sheet in the present invention is not particularly limited as long as a desired receptor layer for a thermal transfer image receptor sheet can be obtained by the method. Examples of such method may include a method: in which a receptor layer forming coating solution containing the above-mentioned polyurethane resin is prepared, the receptor layer forming coating solution is applied to the below-mentioned substrate sheet or the like, and the above is dried.

The receptor layer forming coating solution may be one using a solvent or may be one not using a solvent. The solvent used in the present invention is not particularly limited as long as it can solve the polyurethane resin. Specific examples of the solvent may include: alcohol type solvents such as methanol, ethanol and propanol; aromatic type solvents such as toluene and xylene; ketone type solvents such as methyl ethyl ketone, methyl isobutyl ketone and cyclohexanone; ester type solvents such as ethyl acetate and butyl acetate; and ether type solvents such as tetrahydrofuran and dioxane; or mixtures of these solvents.

The method for coating the receptor layer forming coating solution is not particularly limited. Examples of the method for coating may include a gravure roll method, comma coating method and bar coating method.

C. Thermal Transfer Image Receptor Sheet

Next, the thermal transfer image receptor sheet of the present invention will be explained. The thermal transfer image receptor sheet of the present invention is characterized by the structure comprising: a substrate sheet; and the receptor layer for a thermal transfer image receptor sheet which is provided on at least one of the surfaces of the substrate sheet. In the present invention, a thermal transfer image receptor sheet having excellent dyeing property and the like can be obtained by using the receptor layer for a thermal transfer image receptor sheet.

The receptor layer for a thermal transfer image receptor sheet used in the present invention is the same as those described in the above "B. Receptor layer for thermal transfer image receptor sheet", and the explanations will be therefore omitted.

The substrate sheet used for the thermal transfer image receptor sheet of the present invention is not particularly limited as long as it is used in usual thermal transfer image receptor sheets. Specific examples of the substrate sheet include: paper such as high-quality paper (acid paper, neutralized paper), synthetic paper, coated paper, impregnated paper and inter-paper reinforced paper; and transparent, semi-transparent or colored films or plastics.

Moreover, in the thermal transfer image receptor sheet of the present invention, layers such as an antistatic layer, cushion layer and intermediate layers, to which a white pigment or fluorescent whitening agent is added, may be formed in between the substrate sheet and the receptor layer, according to the need. As the raw material of the intermediate layer, for example, a polyurethane resin, polycarbonate resin, polyamide resin, acryl resin, epoxy resin, urethane resin, polypropylene chloride, polyethyleneimine, alkyltitanate, etc. may be used. Also, the thermal transfer image receptor layer may contain colorants, thermal stabilizer, frame retardant, ultraviolet absorber and radical trapping agent, according to the need.

The present invention is not limited to the aforementioned embodiments. These embodiments are examples and whatever has substantially the same structure and produces the same function and effect as the technical spirit described in the claim of the present invention is embraced by the technical scope of the present invention.

EXAMPLES

Hereinafter, the present invention will be explained further in detail by the following examples. The simple designation of parts indicates parts by weight.

Thermal Transfer Sheet

A magenta ribbon of an ink ribbon P-RBN for a digital color printer P-400 manufactured by OLYMPUS OPTICAL CO., LTD. was used as a thermal transfer sheet in the examples for the below-mentioned evaluation of printing density.

Also, the abbreviations in the examples are as follows.
TPA: Terephthalic acid
IPA: Isophthalic acid
OPA: Orthophthalic acid
NDC: 2,6-Naphthalenedicarboxylic acid
DSN: 5-Sodium sulfoisophthalic acid
EG: Ethylene glycol
PG: 1,2-Propylene glycol
NPG: 2,2-Dimethyl-1,3-propanediol
2MG: 2-Methyl-1,3-propanediol
CHDM: 1,4-cyclohexanedimethanol
HPN: 2,2-dimethyl-3-hydroxypropyl-2',2'-dimethyl-3-hydroxypropanate
IPDI: Isophorone diisocyanate
DCDI: 4,4'-dicyclohexylmethanediisocyanate
MEK: Methyl ethyl ketone
MDI: 4,4'-diphenylmethanediisocyanate Hereinafter, a method for measuring the properties of resins will be explained.

(Hydroxyl Value of Aromatic Polyester Polyol (A-1))

50 g of the polyester polyol was dissolved in 120 g of MEK solvent mixture, 70 g of MDI was added, and was reacted at 70° C. for 2 hours. Then, the density of residual isocyanate groups in the reaction solution was determined quantitatively by titration to find a hydroxyl value.

(Acid Value of Aromatic Polyester Polyol (A-1))

0.2 g of the polyester was dissolved in 20 cm$^3$ of chloroform, and the solution was titrated with a 0.1N potassium hydroxide ethanol solution to find the equivalent (eq/10$^6$ g) per 10$^6$ g of the resin. Phenolphthalein was used as an indicator.

(Number Average Molecular Weight)

The number average molecular weight was measured by gel permeation chromatography (GPC), manufactured by Waters Company, using polystyrene as a standard material and tetrahydrofuran as a solvent. In this case, the peaks of low molecules having molecular weight lower than 300 were deleted in the analysis and the peaks of high molecules having molecular weight of 300 or higher were subjected to data processing to obtain the number average molecular weight.

(Composition Analysis)

$^1$H-NMR analysis was carried out using nuclear magnetic resonance analyzer (NMR) (trade name: Jeminy 200, manufactured by Barian Company) in a heavy chloroform solvent to determine the composition from the integration ratio.

(Glass Transition Temperature)

By producing a polyurethane resin film 30 μm in thickness, and cutting the obtained resin film into a size of 4 mm×15 mm, the dynamic viscoelasticity thereof was measured by using a viscoelasticity measuring device (trade name: DVA-220, manufactured by IT Keisoku Seigyo Co., Ltd.) under condition of frequency of 10 Hz, measuring temperature range of −250 to 200° C., temperature rising rate of 4° C./min. In the loss elastic modulus (E"), the temperature of the point showing the peak was defined as the glass transition temperature. When two peaks were present, a lower peak was expressed as Lo-Tg and a higher peak was expressed as Hi-Tg.

(Density of Polar Groups)

0.1 g of a sample was carbonized and dissolved in an acid to measure the density of Na by atomic absorption analysis. The density of polar groups was given by the following equation:

Na density (ppm)/23 (atomic weight of Na)=Density of polar groups (equivalents/10$^6$ g)

Synthetic Example 1 of Aromatic Polyester Polyol (A-1)

A reactor equipped with a temperature gage, a stirrer, a wigglew tube and Liebig's cooler was charged with 190 parts of dimethyl terephthalate, 5.9 parts of dimethyl 5-sulfoisophthalate, 152 parts of 1,2-propylene glycol and 0.2 parts of tetrabutoxy titanium, and an ester exchange reaction was carried out at 200 to 230° C. for 4 hours. Then, the mixture was raised to 240° C. over 10 minutes. At the same time, the pressure in the system was gradually reduced, react the mixture for 30 minutes, thereby finishing the polymerization. The composition, number average molecular weight, hydroxyl value and acid value of the obtained polyester diol (a) are shown in Table 1.

Synthetic Examples 2 to 4 of Aromatic Polyester Polyol (A)

The compositions, number average molecular weights, hydroxyl values and acid values of polyester polyols (b) to (d) synthesized in the same procedures as in Synthetic Example 1 are shown in Table 1.

Comparative Synthetic Example 1 of Aromatic Polyester Polyol (A-1)

A reactor equipped with a temperature gage, a stirrer, a wigglew tube and Liebig's cooler was charged with 97 parts of dimethyl terephthalate, 91 parts of dimethylisophthalate, 8.9 parts of dimethyl 5-sulfoisophthalate, 76 parts of 2,2- dimethyl-1,3-propanediol, 91 parts of ethylene glycol and 0.2 parts of tetrabutoxy titanium, and an ester exchange reaction was carried out at 200 to 230° C. for 4 hours. Then, the mixture was raised to 240° C. over 10 minutes. At the same time, the pressure in the system was gradually reduced, react the mixture for 5 minutes, thereby finishing the polymerization. The composition, number average molecular weight, hydroxyl value and acid value of the obtained polyester diol (e) are shown in Table 1.

TABLE 1

|  |  |  | Aromatic polyester/polyol |  |  |  |  |
|---|---|---|---|---|---|---|---|
|  |  |  | a | b | c | d | e |
| Composition molar ratio | Acid component | TPA | 98 | 50 |  | 60 | 50 |
|  |  | IPA |  | 47 | 48 |  | 47 |
|  |  | OPA |  |  | 37 |  |  |
|  |  | NDC |  |  | 48 |  |  |
|  |  | DSN | 2 | 3 | 4 | 3 | 3 |
|  | Glycol component | EG |  | 52 |  | 31 | 56 |
|  |  | PG | 100 |  |  | 69 |  |
|  |  | 2MG |  |  | 25 |  |  |
|  |  | NPG |  | 48 | 51 |  | 44 |
|  |  | CHDM |  |  | 24 |  |  |
| Hydroxyl value (equivalent/$10^6$ g) |  |  | 950 | 800 | 500 | 1500 | 4000 |
| Acid value (equivalent/$10^6$ g) |  |  | 5 | 8 | 7 | 9 | 12 |
| Number average molecular weight |  |  | 2100 | 2500 | 4000 | 1300 | 500 |
| Amount of metallic base sulfonate (equivalent/$10^6$ g) |  |  | 96 | 134 | 144 | 146 | 118 | to obtain a polyurethane resin (A). The molecular weight and mechanical properties of the polyurethane resin (A) are shown in Table 2.

Synthetic Examples 2 to 10 of a Polyurethane Resin

Polyurethane resins (B) to (J) were synthesized by the same method as in Synthetic Example 1. The resin composition, molecular weight and mechanical properties of each polyurethane resin are shown in Table 2.

Comparative Synthetic Example 1 of a Polyurethane Resin

A polyurethane resin (K) was synthesized by the same method as in Synthetic Example 1. The resin composition, molecular weight and mechanical properties are shown in Table 2. In this example, the point that the polyurethane resin has one glass transition temperature and the high molecular weight polyol (A-2) and the organic isocyanate (B) are out of the scope of the claims.

Comparative Synthetic Example 2 of a Polyurethane Resin

A polyurethane resin (L) was synthesized by the same method as in Synthetic Example 1. The resin composition, molecular weight and the mechanical properties are shown in Table 2. In this example, the point that the polyurethane resin has one glass transition temperature and the ratio of (A-2) in the high molecular weight polyol (A) are out of the scope of the claims.

Comparative Synthetic Example 3 of a Polyurethane Resin

A polyurethane resin (M) was synthesized by the same method as in Synthetic Example 1. The resin composition, molecular weight and mechanical properties are shown in Table 2. In this example, the point that the polyurethane resin has one glass transition temperature and the number average molecular weight of the high molecular weight polyol (A) are out of the scope of the claims.

TABLE 2

|  |  | Raw material composition |  |  |  | Properties |  |  |
|---|---|---|---|---|---|---|---|---|
| Polyurethane |  | Aromatic polyester polyol (A-1) component | Polyol (A-2) component | Polyol compound (C) component | Organic diisocyanate (B) component | Glass transition temperature (° C.) | Number average molecular weight (Mn) | Density of SO$_3$Na group (eq/$10^6$ g) |
| Synthetic Example | A | a: 100 parts | PP2000: 30 parts | HPN: 10 parts | IPDI: 24 parts | Lo-Tg: −6, Hi-Tg 63 | 21,000 | 60 |
|  | B | a: 100 parts | PP3000: 35 parts | HPN: 10 parts | IPDI: 23 parts | Lo-Tg: −78, Hi-Tg: 61 | 30,000 | 57 |
|  | C | a: 100 parts | PP2000: 30 parts | HPN: 10 parts | DCDI: 28 parts | Lo-Tg: −64, Hi-Tg: 65 | 28,000 | 58 |
|  | D | b: 100 parts | PP2000: 30 parts | HPN: 10 parts | IPDI: 22 parts | Lo-Tg: −68, Hi-Tg: 58 | 20,000 | 83 |
|  | E | b: 100 parts | PP1200: 30 parts | HPN: 10 parts | IPDI: 24 parts | Lo-Tg: −54, Hi-Tg: 49 | 18,000 | 82 |
|  | F | b: 100 parts | PP2000: 35 parts | — | DCDI: 15 parts | Lo-Tg: −69, Hi-Tg: 52 | 35,000 | 89 |
|  | G | c: 100 parts | PP2000: 25 parts | HPN: 10 parts | IPDI: 19 parts | Lo-Tg: −62, Hi-Tg: 70 | 27,000 | 94 |
|  | H | c: 100 parts | PP1200: 40 parts | HPN: 20 parts | IPDI: 33 parts | Lo-Tg: −61, Hi-Tg: 53 | 32,000 | 74 |
|  | I | d: 100 parts | PP2000: 28 parts | — | IPDI: 19 parts | Lo-Tg: −48, Hi-Tg: 57 | 23,000 | 99 |
|  | J | d: 100 parts | PP3000: 30 parts | HPN: 10 parts | IPDI: 29 parts | Lo-Tg: −22, Hi-Tg: 48 | 22,000 | 86 |
| Comparative Synthetic Example | K | a: 100 parts | ODX688: 30 parts | HPN: 10 parts | MDI: 27 parts | 54 | 26,000 | 59 |
|  | L | a: 100 parts | PP2000: 15 parts | HPN: 10 parts | IPDI: 22 parts | 69 | 21,000 | 65 |
|  | M | e: 100 parts | PP2000: 25 parts | HPN: 10 parts | IPDI: 55 parts | 64 | 23.000 | 62 |

PP1200 to 3000: Polypropylene glycol manufactured by Sanyo Chemical Industries, Ltd.
ODX688: adipate type polyester manufactured by Dainippon Ink and Chemicals, Incorporated Synthetic Example 1 of a Polyurethane Resin 100 parts of the aromatic polyester polyol (a), 30 parts of PP-2000 (polypropylene glycol, manufactured by Sanyo Chemical Industries, Ltd.) and 10 parts of HPN were dissolved in 55 parts of MEK (methyl ethyl ketone) and 55 parts of toluene. 24 parts of IPDI was added and 0.05 parts of dibutyltin dilaurate was then added as a catalyst, and the mixture was reacted at 80° C. for 5 hours. Then, the solution was diluted with 136 parts of MEK and 136 parts of toluene Example 1

A synthetic paper (trade name: YUPO FPG#150, manufactured by Oji Yuka Corp.) 150 μm in thickness was used as a substrate sheet. A receptor layer coating solution of the following composition was applied to one surface of the substrate sheet by a wire bar such that the layer after drying will be 2.5 g/m² and then, the solution was dried (120° C., 90 seconds) to obtain a thermal transfer image receptor sheet of the present invention.

| (Receptor layer coating solution 1) | |
|---|---|
| Polyurethane resin A shown in Table 1 | 100 parts |
| KF-615A (silicone, manufactured by Shin-Etsu Chemical Co., Ltd.) | 2 parts |
| X-62-1421B (silicone, manufactured by Shin-Etsu Chemical Co., Ltd.) | 2 parts |
| A-14 (polyisocyanate, manufactured by Mitsui Takeda Chemical Co., Ltd. | 6 parts |
| SCAT-52A (tin type catalyst, manufactured by Sankyo Organic chemicals Co., Ltd. | 0.1 parts |
| Methyl ethyl ketone | 25 parts |
| Toluene | 25 parts |

Example 2

A thermal transfer image receptor sheet of the present invention was obtained in the same manner as in Example 1 except that the polyurethane resin B was used in place of the polyurethane resin A in the receptor layer coating solution 1 described in Example 1.

Example 3

A thermal transfer image receptor sheet of the present invention was obtained in the same manner as in Example 1 except that the polyurethane resin C was used in place of the polyurethane resin A in the receptor layer coating solution 1 described in Example 1.

Example 4

A thermal transfer image receptor sheet of the present invention was obtained in the same manner as in Example 1 except that the polyurethane resin D was used in place of the polyurethane resin A in the receptor layer coating solution 1 described in Example 1.

Example 5

A thermal transfer image receptor sheet of the present invention was obtained in the same manner as in Example 1 except that the polyurethane resin E was used in place of the polyurethane resin A in the receptor layer coating solution 1 described in Example 1.

Example 6

A thermal transfer image receptor sheet of the present invention was obtained in the same manner as in Example 1 except that the polyurethane resin F was used in place of the polyurethane resin A in the receptor layer coating solution 1 described in Example 1.

Example 7

A thermal transfer image receptor sheet of the present invention was obtained in the same manner as in Example 1 except that the polyurethane resin G was used in place of the polyurethane resin A in the receptor layer coating solution 1 described in Example 1.

Example 8

A thermal transfer image receptor sheet of the present invention was obtained in the same manner as in Example 1 except that the polyurethane resin H was used in place of the polyurethane resin A in the receptor layer coating solution 1 described in Example 1.

Example 9

A thermal transfer image receptor sheet of the present invention was obtained in the same manner as in Example 1 except that the polyurethane resin I was used in place of the polyurethane resin A in the receptor layer coating solution 1 described in Example 1.

Example 10

A thermal transfer image receptor sheet of the present invention was obtained in the same manner as in Example 1 except that the polyurethane resin J was used in place of the polyurethane resin A in the receptor layer coating solution 1 described in Example 1.

Comparative Example 1

A thermal transfer image receptor sheet was obtained in the same manner as in Example 1 except that the polyurethane resin K was used in place of the polyurethane resin A in the receptor layer coating solution 1 described in Example 1.

Comparative Example 2

A thermal transfer image receptor sheet was obtained in the same manner as in Example 1 except that the polyurethane resin L was used in place of the polyurethane resin A in the receptor layer coating solution 1 described in Example 1.

Comparative Example 3

A thermal transfer image receptor sheet was obtained in the same manner as in Example 1 except that the polyurethane resin M was used in place of the polyurethane resin A in the receptor layer coating solution 1 described in Example 1.

Next, the thermal transfer sheet and thermal transfer image receptor sheet produced in the above-mentioned manner were combined to be evaluated as shown below.

As to the thermal transfer sheet and thermal transfer image receptor sheet produced in the above-mentioned procedures, the receptor layer part of the thermal transfer image receptor sheet and the dye layer part of the thermal transfer sheet were overlapped on each other. The laminate was pressure welded by using a thermal head having a resolution of 300 dot/inch and an average resistance of 3100Ω and a platen roll. The laminate was heated by the thermal head from the back side of the dye layer part, under condition of: the applying energy was increased stepwise in a range of 0.02 to 0.3 mJ/dot; and feed speed of 5.0 ms/line. Thereby forming an image on the receptor sheet, and a print product was obtained.

Evaluation of Print Density

With regard to the print product obtained in the above-mentioned procedures, its optical reflection density was measured by an optical densitometer (trade name: RD-918, Gretag Macbeth Company) to find the maximum reflection density.

(Evaluation Standard)

⊚: Print density is 2.3 or higher which shows a very good print condition.

◯: Print density is 2.1 or higher and less than 2.3 which shows a good print condition.

Δ: Print density is 1.9 or higher and less than 2.1 which shows a slightly inferior print condition.

Evaluation of Light Resistance

The light resistance of the print product obtained in the procedures was evaluated by a xenon fade meter operated in the following condition.

(Condition of Evaluation of Light Resistance)
Irradiation tester: Ci135 manufactured by Atlas Company
Light source: Xenon lamp
Filter: Inside: IR filter, Outside: Soda lime glass Black panel temperature: 45° C.
Irradiation intensity: 1.2 (W/m$^2$), values measured at 420 nm
Irradiation energy: 400 (kJ/m$^2$), integrated values at 420 nm (Evaluation Standard)
The optical reflection density of the print product was measured by an optical densitometer (trade name: RD-918, Gretag Macbeth Company) and the hue (L*a*b*) of the print product was measured by a color difference meter (trade name: CR-321, manufactured by Minolta Camera Co., Ltd.), before and after xenon irradiation, to find density residual ratio and hue variation (ΔE*a*b*) as the indications of light resistance.
○: The hue variation is less than 5.0 and the residual ratio is 90% or higher, the light resistance of the print product is good.
Δ: The hue variation is 5.0 or higher and less than 10.0 and the residual ratio is 70% or higher and less than 90%, the light resistance of the print product is slightly inferior.
x: The hue variation is 10.0 or higher and the residual ratio is less than 70%, the light resistance of the print product is inferior.

The print product was overall evaluated from both of the print density and the evaluation standard of light resistance as shown above.

(Evaluation Standard)
○: Good as the properties of the print product.
Δ: Slightly inferior as the properties of the print product.
x: Inferior as the properties of the print product.

The results of the print density and evaluation of light resistance in the Examples 1 to 10 and Comparative Examples 1 to 3 are as shown in the following Table 3.

TABLE 3

|  | Print density | | Light resistance | | | Overall evaluation |
|---|---|---|---|---|---|---|
|  | Density | Evaluation | Hue variation | Density residual ratio | Evaluation | |
| Example 1 | 2.38 | ◉ | 2.76 | 97% | ○ | ○ |
| Example 2 | 2.16 | ○ | 2.43 | 97% | ○ | ○ |
| Example 3 | 2.24 | ○ | 3.32 | 96% | ○ | ○ |
| Example 4 | 2.17 | ○ | 2.87 | 97% | ○ | ○ |
| Example 5 | 2.32 | ◉ | 3.36 | 96% | ○ | ○ |
| Example 6 | 2.23 | ○ | 3.16 | 96% | ○ | ○ |
| Example 7 | 2.36 | ◉ | 4.89 | 90% | ○ | ○ |
| Example 8 | 2.33 | ◉ | 3.42 | 95% | ○ | ○ |
| Example 9 | 2.34 | ◉ | 3.22 | 96% | ○ | ○ |
| Example 10 | 2.34 | ◉ | 2.98 | 97% | ○ | ○ |
| Comparative Example 1 | 2.02 | Δ | 25.7 | 62% | X | X |
| Comparative Example 2 | 2.08 | Δ | 6.71 | 88% | Δ | X |
| Comparative Example 3 | 2.06 | Δ | 7.52 | 85% | Δ | X |

In Table 3 shown above, Comparative Example 1 shows the results of using a usual urethane resin and has a low print density and is also inferior in light resistance. Comparative Examples 2 and 3 show the results of using a usual urethane resin improved in light resistance. They are slightly inferior in print density and light resistance, that is, not satisfactory properties. Examples 1 to 10 respectively show the results of using a urethane resin having a specific structure. They have good light resistance and print products having high print densities can be obtained.

From the results, according to the present invention, a receptor layer forming resin for a thermal transfer image receptor sheet and a thermal transfer image receptor sheet using the same having excellent dyeing property, light resistance, mold-releasing property, etc. can be obtained.

What is claimed is:

1. A thermal transfer image receptor sheet comprising: a substrate sheet; and a receptor layer provided on at least one surface of the substrate sheet,
   wherein the receptor layer is formed by using a receptor layer forming polyurethane resin for a thermal transfer image receptor sheet obtained by copolymerizing: a high molecular weight polyol having a number average molecular weight of 1000 or higher (A); an organic isocyante (B); and according to need, a polyol compound having a number average molecular weight of 500 or lower (C), and
   wherein the receptor layer forming polyurethane resin for a thermal transfer image receptor sheet meets the following requirements (1) to (4):
   (1) the resin has at least two glass transition temperatures;
   (2) at least one of the glass transition temperatures is between −200 to 0° C., and at least one is between 20 to 100° C.;
   (3) the high molecular weight polyol (A) is a mixture comprising; an aromatic polyester polyol containing metallic base sulfonate (A-1); and a polyol other than said (A-1) (A-2); and
   (4) the ratio of (A-2) in the high molecular weight polyol (A) is 20 mass percent or higher.

2. The thermal transfer image receptor sheet according to claim 1, wherein the polyol (A-2) is a polypropylene glycol.

3. The thermal transfer image receptor sheet according to claim 1, wherein the organic isocyanate (B) is an alicyclic or aliphatic diisocyanate.

* * * * *